United States Patent
Park et al.

(10) Patent No.: US 10,497,989 B2
(45) Date of Patent: Dec. 3, 2019

(54) BATTERY MODULE INCLUDING VOLTAGE SENSING MEMBER HAVING RECEPTACLE STRUCTURE

(71) Applicant: LG CHEM, LTD., Seoul (KR)

(72) Inventors: Jinhong Park, Daejeon (KR); Hyoungsuk Lee, Daejeon (KR); Jong Moon Yoon, Daejeon (KR); Bohyon Kim, Daejeon (KR); Soon Chang Hong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 574 days.

(21) Appl. No.: 15/123,572

(22) PCT Filed: Feb. 26, 2015

(86) PCT No.: PCT/KR2015/001849
§ 371 (c)(1),
(2) Date: Sep. 2, 2016

(87) PCT Pub. No.: WO2015/133760
PCT Pub. Date: Sep. 11, 2015

(65) Prior Publication Data
US 2017/0077562 A1 Mar. 16, 2017

(30) Foreign Application Priority Data
Mar. 6, 2014 (KR) .......................... 10-2014-0026422

(51) Int. Cl.
*H01M 10/48* (2006.01)
*H01M 2/10* (2006.01)
(Continued)

(52) U.S. Cl.
CPC ....... *H01M 10/482* (2013.01); *H01M 2/1077* (2013.01); *H01M 2/206* (2013.01);
(Continued)

(58) Field of Classification Search
CPC .. H01M 10/482; H01M 2/1077; H01M 2/206; H01M 10/425
See application file for complete search history.

(56) References Cited

U.S. PATENT DOCUMENTS 9,372,237 B2 * 6/2016 Choi ................. H01M 10/482
9,484,591 B2 * 11/2016 Shin ...................... H01M 2/22
(Continued)

FOREIGN PATENT DOCUMENTS

EP 2538466 A2 12/2012
JP 10-275646 A 10/1998
(Continued)

OTHER PUBLICATIONS

International Search Report for PCT/KR2015/001849 dated May 28, 2015.

*Primary Examiner* — Abdullah A Riyami
*Assistant Examiner* — Nader J Alhawamdeh
(74) *Attorney, Agent, or Firm* — Birch, Stewart, Kolasch & Birch, LLP

(57) ABSTRACT

Disclosed is a battery module including a battery cell stack including a structure in which a plurality of battery cells connected to each other in series and/or in parallel is stacked and each of the battery cells is stood on one side thereof, voltage sensing members provided with connecting terminals electrically connected to electrode terminal connection parts of the battery cells for detecting voltages of the battery cells, an upper case covering the end of one side of the battery cell stack and portions of upper and lower ends of the battery cell stack, the upper case being provided with mounting parts, into which the voltage sensing members are inserted and mounted, and a lower case coupled to the upper
(Continued)

case while covering the end of the other side of the battery cell stack and portions of the upper and lower ends of the battery cell stack.

18 Claims, 5 Drawing Sheets

(51) Int. Cl.
  *H01M 2/20* (2006.01)
  *H01M 10/42* (2006.01)

(52) U.S. Cl.
  CPC .. *H01M 10/425* (2013.01); *H01M 2010/4271* (2013.01); *H01M 2220/20* (2013.01)

(56) References Cited

U.S. PATENT DOCUMENTS

| | | | | |
|---|---|---|---|---|
| 9,608,244 | B2* | 3/2017 | Shin | H01M 2/1077 |
| 2009/0305116 | A1* | 12/2009 | Yang | H01M 2/0212 |
| | | | | 429/61 |
| 2011/0195285 | A1* | 8/2011 | Shin | H01M 2/22 |
| | | | | 429/93 |
| 2012/0003528 | A1 | 1/2012 | Kusukawa et al. | |
| 2013/0045403 | A1* | 2/2013 | Shin | H01M 2/1077 |
| | | | | 429/90 |
| 2013/0078487 | A1 | 3/2013 | Shin et al. | |
| 2013/0308679 | A1* | 11/2013 | Choi | H01M 10/482 |
| | | | | 374/152 |
| 2014/0134462 | A1 | 5/2014 | Choi et al. | |

FOREIGN PATENT DOCUMENTS

| | | |
|---|---|---|
| JP | 2011-119075 A | 6/2011 |
| JP | 2012-14952 A | 1/2012 |
| JP | 2013-524461 A | 6/2013 |
| JP | 2014-532958 A | 12/2014 |
| KR | 10-2011-0112900 A | 10/2011 |
| KR | 10-2012-0108260 A | 10/2012 |
| KR | 10-2013-0018494 A | 2/2013 |
| KR | 10-1327473 B1 | 11/2013 |
| WO | WO-2012121505 A2 * 9/2012 .......... H01M 10/482 |

* cited by examiner

[FIG. 1]
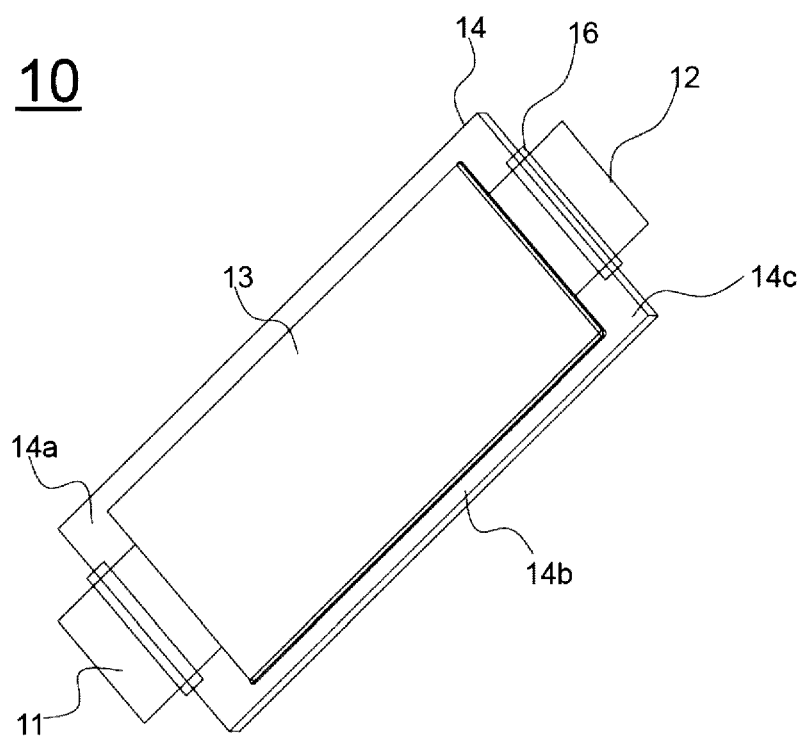

[FIG. 2]
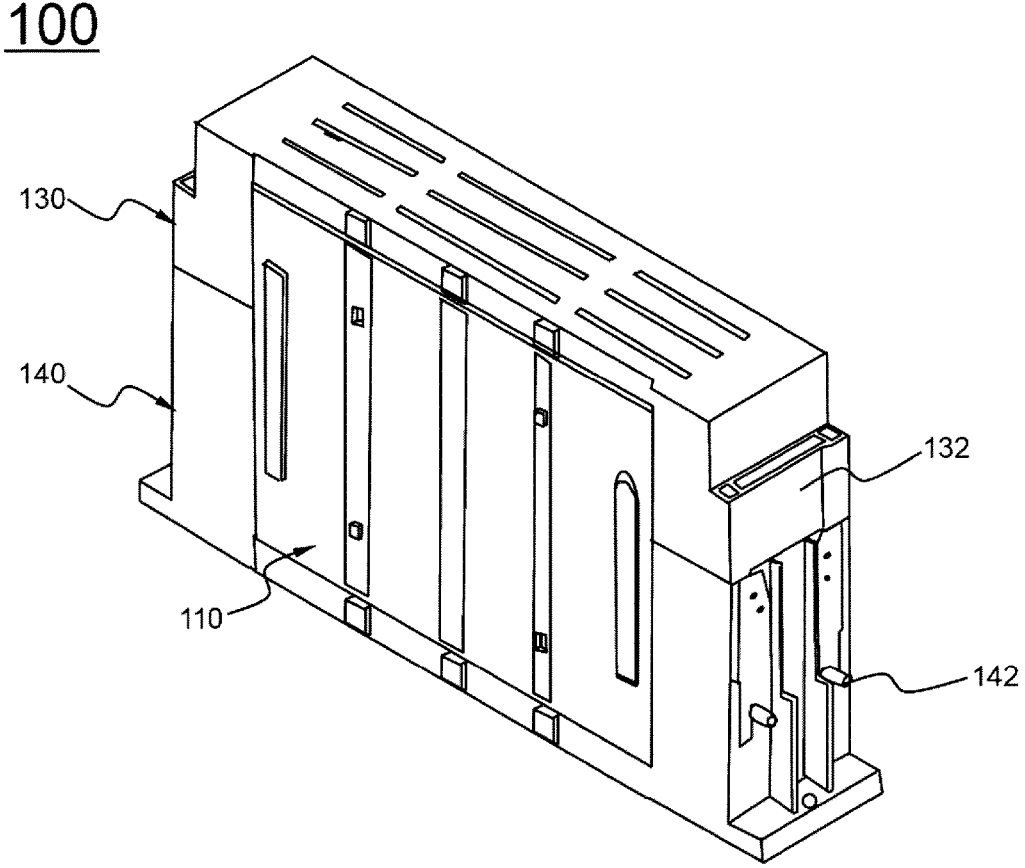

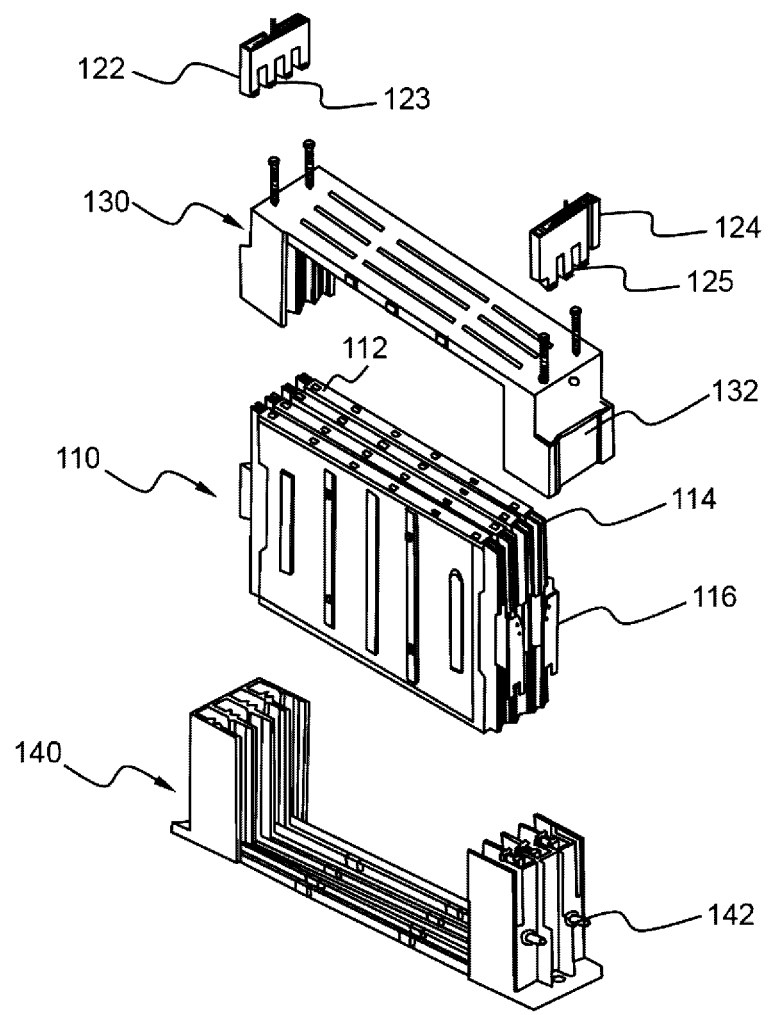
【FIG. 3】

[FIG. 4]
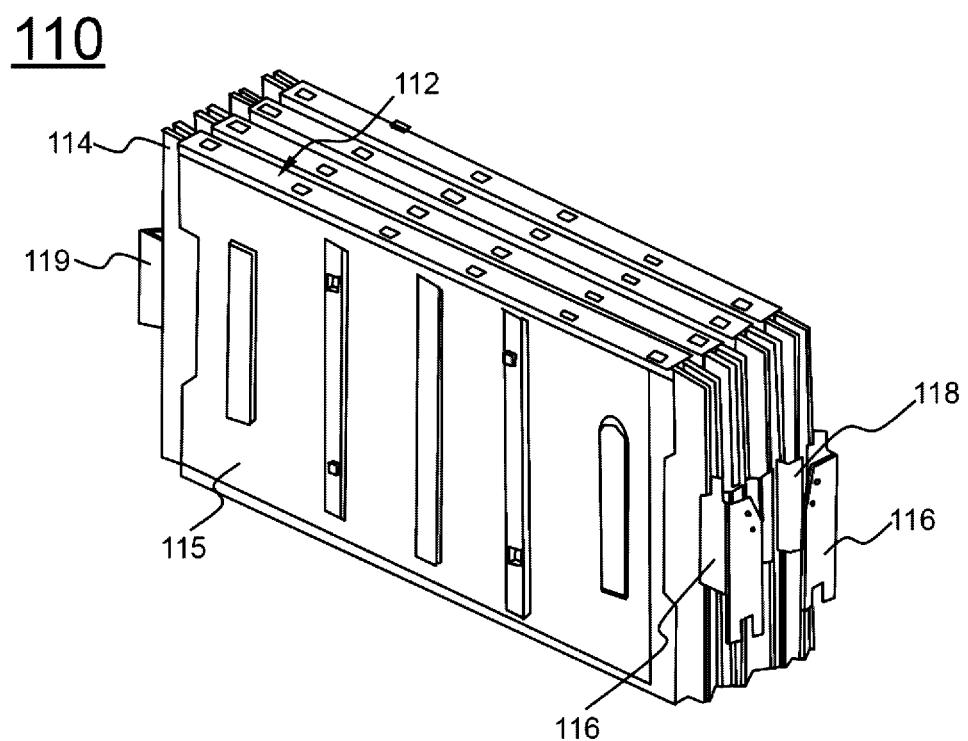

[FIG. 5]
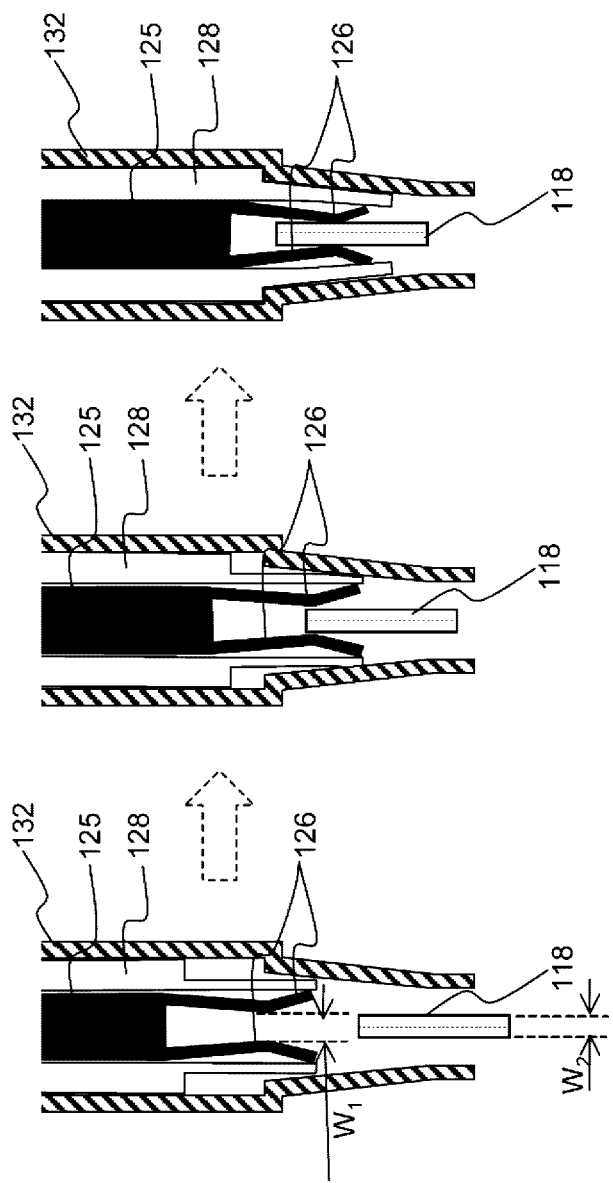

BATTERY MODULE INCLUDING VOLTAGE SENSING MEMBER HAVING RECEPTACLE STRUCTURE

TECHNICAL FIELD

The present invention relates to a battery module including a voltage sensing member having a receptacle structure.

BACKGROUND ART

In recent years, a secondary battery, which can be charged and discharged, has been widely used as an energy source for wireless mobile devices. In addition, the secondary battery has attracted considerable attention as a power source for devices which require high output and large capacity, such as electric vehicles (EV), hybrid electric vehicles (HEV), and plug-in hybrid electric vehicles (Plug-in HEV), which have been developed to solve problems, such as air pollution, caused by existing gasoline and diesel vehicles that use fossil fuels.

Small-sized mobile devices use one or a few battery cells for each device. On the other hand, middle or large-sized devices, such as vehicles, use a battery module having a plurality of battery cells electrically connected to each other because high output and large capacity are necessary for the middle or large-sized devices.

Preferably, a battery module is manufactured so as to have as small a size and weight as possible. For this reason, a prismatic battery or a pouch-shaped battery, which can be stacked with high integration and has a small weight to capacity ratio, is usually used as a battery cell of a middle or large-sized battery module. In particular, much interest is currently focused on the pouch-shaped battery, which uses an aluminum laminate sheet as a sheathing member, because the pouch-shaped battery is lightweight and the manufacturing cost of the pouch-shaped battery is low.

In addition, the battery module is configured to have a structure in which a plurality of battery cells is combined. In the case in which overvoltage is applied to some of the battery cells, overcurrent flows in some of the battery cells, or some of the battery cells overheat, therefore, the safety and operational efficiency of the battery module are seriously concerned. For this reason, it is necessary to provide means to detect and control such overvoltage, overcurrent, or overheating. Consequently, voltage sensors are connected to the respective battery cells in order to check and control the operational state of the battery cells in real time or at predetermined time intervals. However, the installation or connection of such detection means greatly complicates the process of assembling the battery module. In addition, there is a possibility that a short circuit may occur due to a plurality of wires for the detection means. In addition, as a secondary battery is used as a power source for vehicles as the result of extension in an application range of the secondary battery, it is necessary to provide fastening members that are capable of maintaining the stable contact state of the detection means even when strong impact or vibration is applied to the secondary battery.

Generally, the voltage sensors are connected to electrode terminals of the battery cells by welding. Alternatively, the voltage sensors may be physically connected to the electrode terminals of the battery cells. Specifically, the voltage sensors may be connected to the electrode terminals of the battery cells in the state in which the voltage sensors are in tight contact with the electrode terminals of the battery cells.

In the case in which the voltage sensors are connected to the electrode terminals of the battery cells by welding, however, the electrode terminals of the battery cells may be damaged. In addition, a space for welding and accuracy in welding are required. As a result, the manufacturing process is complicated, and the manufacturing cost is increased.

In the case in which the voltage sensors are connected to the electrode terminals of the battery cells in the state in which the voltage sensors are in tight contact with the electrode terminals of the battery cells, on the other hand, various kinds of problems occur. That is, when the electrode terminals of the battery cells are pressed in order to maintain the connection between the voltage sensors and the electrode terminals of the battery cells or when the electrode terminals of the battery cells are inserted into the voltage sensors, the electrode terminals of the battery cells may be damaged.

Meanwhile, in the case in which a plurality of battery cells is used to constitute a battery module or in the case in which a plurality of unit modules, each of which includes a predetermined number of battery cells, is used to constitute a battery module, a plurality of members is generally needed for mechanical fastening and electrical connection therebetween, and the process of assembling these members is very complicated. Furthermore, a space for performing the coupling, welding, or soldering of these members for mechanical fastening and electrical connection is required, with the result that the overall size of the system is increased, which is not desirable, as previously described. Therefore, there is a high necessity for a battery module that is compact and exhibits excellent structural safety.

DISCLOSURE

Technical Problem

The present invention has been made to solve the above problems and other technical problems that have yet to be resolved.

Specifically, it is an object of the present invention to provide a battery module including a voltage sensing member that can be manufactured using a simple assembly method without using a plurality of members for mechanical fastening and electrical connection.

It is another object of the present invention to provide a battery module configured to have a structure in which it is possible to prevent damage to an electrode terminal, which may occur when a voltage sensing member is fastened and connected to the electrode terminal, with the result that it is possible to reduce the defect rate in the battery module manufacturing process, thereby improving the productivity and safety of the battery module.

Technical Solution

In accordance with one aspect of the present invention, the above and other objects can be accomplished by the provision of a battery module including a battery cell stack configured to have a structure in which a plurality of battery cells or unit modules connected to each other in series and/or in parallel is stacked in the state in which each of the battery cells or the unit modules is stood on one side thereof, voltage sensing members provided with connecting terminals electrically connected to electrode terminal connection parts of the battery cells, located at the front and the rear of the battery cell stack, for detecting voltages of the battery cells or the unit modules, an upper case configured to have a structure for covering the end of one side of the battery cell stack and portions of upper and lower ends of the battery cell stack, the upper case being provided with mounting parts, into which the voltage sensing members are inserted and mounted, and a lower case configured to have a structure that is coupled to the upper case while covering the end of the other side of the battery cell stack and portions of the upper and lower ends of the battery cell stack, the lower case being provided at the front thereof with external input and output terminals, wherein each of the voltage sensing members is configured to have a receptacle structure in which each of the voltage sensing members is fitted onto a corresponding one of the electrode terminal connection parts from the upper part of each of the voltage sensing members, and each of the mounting parts is configured to have a structure in which the width of the mounting part is decreased in the direction in which a corresponding one of the electrode terminal connection parts is inserted.

That is, the battery module according to the present invention is configured to have a structure in which the voltage sensing members are electrically connected to the electrode terminal connection parts of the battery cells, which are located at the front and the rear of the battery cell stack in the state in which the voltage sensing members are inserted and mounted into the mounting parts, which are located at the front and the rear of the upper case. Consequently, the process of assembling the battery module is simplified, the structure of the battery module is compact, and it is possible to stably detect the voltage of the battery module.

In addition, the members for detecting voltages of the battery cells are modularized in order to constitute the voltage sensing members. Consequently, the voltage sensing members may be easily mounted to the front and the rear of the battery module, and the middle connection part of the voltage detection structure is minimized, thereby improving the reliability of voltage detection.

In addition, when the voltage sensing members are faulty, the voltage sensing members may be easily separated from the front and the rear of the battery module and may be replaced with new ones without disassembling the battery module, unlike a conventional battery module structure. Consequently, it is possible to greatly improve the maintenance of the battery module.

At least some of the electrical connection portions of the battery cells in each of the unit modules or between the unit modules may be connected to each other in series. Electrode terminals of battery cells may be coupled to each other in the state in which the battery cells are arranged such that the electrode terminals of the battery cells are adjacent to each other. A predetermined number of battery cells are covered by a cell cover. In this way, it is possible to manufacture a plurality of unit modules. Some sequences of the manufacturing process may be changed. For example, a plurality of unit modules may be manufactured, and then electrical connection between the unit modules may be made.

The battery cell stack, in which the battery cells are stacked with high integration in the state in which the electrode terminals of the battery cells are connected to each other, is vertically mounted between the upper case and the lower case, which are separably coupled to each other so as to have an assembly type fastening structure.

The upper and lower cases may be configured to have a structure in which the upper and lower cases cover only the outer edge of the battery cell stack such that the outer surface of the battery cell stack is exposed from the upper and lower cases in order to easily dissipate heat from the battery cell stack in the state in which the battery cell stack is mounted between the upper case and the lower case and then upper case and the lower case are coupled to each other. That is, the upper case may be configured to have a structure for covering the end of one side of the battery cell stack and portions of the upper and lower ends of the battery cell stack, and the lower case may be configured to have a structure for covering the end of the other side of the battery cell stack and portions of the upper and lower ends of the battery cell stack.

In addition, each of the voltage sensing members is configured to have a receptacle structure in which a corresponding one of the electrode terminal connection parts is inserted into each of the voltage sensing members from the upper part of each of the voltage sensing members. Consequently, it is possible to stably maintain the electrical connection between the voltage sensing members and the electrode terminal connection parts of the battery cells even when external impact is applied to the battery module.

For example, each of the battery cells may be a plate-shaped battery cell having electrode terminals formed at the upper end and the lower end thereof.

The structure of each of the voltage sensing members is not particularly restricted as long as the each of the voltage sensing members is electrically connected to a corresponding one of the electrode terminal connection parts so as to easily detect the voltages of the battery cells or the unit modules. For example, the voltage sensing members may be configured to have a structure including a front sensing member connected to one of the electrode terminal connection parts located at the front of the battery cell stack and a rear sensing member connected to the other of the electrode terminal connection parts located at the rear of the battery cell stack.

Consequently, the front sensing member and the rear sensing member may be inserted into the mounting parts formed in the upper case such that the front sensing member and the rear sensing member can be easily electrically connected to the electrode terminal connection parts, which are located at the front and the rear of the battery cell stack.

Specifically, the front sensing member and the rear sensing member may each include a connector-type hollow body and a connection terminal connected to a series-connected bent portion of electrode terminals of the battery cells (a corresponding one of the electrode terminal connection parts) in the state of being inserted in the body.

In an example of the above structure, the body may be configured to have a structure in which the lower part of the body is divided into a plurality of parts such that each of the electrode terminal connection parts is inserted into a corresponding one of the connection terminals. Consequently, the connection terminals of the voltage sensing members, which are inserted into the lower divided parts of the body, can be easily electrically connected to the electrode terminal connection parts of the battery cells located at the front and the rear of the battery cell stack.

The number of lower divided parts of the body of each of the front and rear sensing members may be changed depending on the number of unit modules constituting the battery module, the structure in which the unit modules are connected to each other in series and/or in parallel, or the shape of the busbar. For example, in the case in which the battery cell stack is configured to have a structure in which four unit modules (i.e. eight battery cells) are stacked in the state in which each of the unit modules (i.e. the battery cells) is stood on one side thereof, the body of the front sensing member may be configured to have a structure in which the lower part of the body is divided into three parts, and the body of the rear sensing member may be configured to have a structure in which the lower part of the body is divided into four parts, such that the body of the front sensing member and the body of the rear sensing member are connected to the electrode terminal connection parts located at the front and the rear of the battery cell stack.

Each of the connecting terminals may include two or more connection pieces that are elastically connected to opposite sides of a corresponding one of the electrode terminal connection parts.

In the state in which each of the connecting terminals is not connected to a corresponding one of the electrode terminal connection parts, the distance between the connection pieces, connected to opposite sides of a corresponding one of the electrode terminal connection parts, may be greater than the width of a corresponding one of the electrode terminal connection parts. In this case, the distance between the connection pieces may be 105% to 200% of the width of a corresponding one of the electrode terminal connection parts.

In addition, the connection pieces may be configured to have a structure in which the distance between the connection pieces is decreased such that the connection pieces come into tight contact with the opposite sides of a corresponding one of the electrode terminal connection parts as a corresponding one of the electrode terminal connection parts is inserted into the connection pieces.

This structure is realized as a structure in which the width of each of the mounting parts is gradually decreased in the direction in which a corresponding one of the electrode terminal connection parts is inserted. That is, the distance between the connection pieces, which are disposed in tight contact with the inside of each of the mounting parts, is decreased due to the structure in which the width of each of the mounting parts is decreased as a corresponding one of the electrode terminal connection parts is inserted into the connection pieces, with the result that the connection pieces come into tight contact with the opposite sides of a corresponding one of the electrode terminal connection parts.

The mounting parts may be formed in the front and the rear of the upper case such that the mounting parts are open upward. Consequently, it is possible to achieve electrical connection between the voltage sensing members and the electrode terminal connection parts by inserting the voltage sensing members into the mounting parts from above after the battery module has been assembled.

According to circumstances, the voltage sensing members, which are open upward, may be covered by insulative covers such that the voltage sensing members are sealed from the outside. Alternatively, the covers for sealing the voltage sensing members may not be formed as separate members, but the covers for sealing the voltage sensing members may be integrally formed on the upper case.

The battery cell stack may include a plurality of unit modules, each of which comprises a plurality of plate-shaped battery cells, each of which has electrode terminals formed at the upper and lower ends thereof. Each of the unit modules may include two or more battery cells, the electrode terminals of which are connected to each other in series and/or in parallel, and a pair of high-strength cell covers coupled to each other so as to cover the entirety of the outer surface of the battery cell stack excluding the electrode terminals of the battery cells.

The structure in which the electrode terminals are connected to each other in series is not particularly restricted as long as the electrode terminals can be easily electrically connected to each other. For example, the electrode terminals may be directly connected to each other by welding. Alternatively, the electrode terminals may be connected to each other using busbars.

Meanwhile, the battery module according to the present invention may have a compact structure, and mechanical fastening and electrical connection, which are structurally stable, may be achieved without using a large number of members. In addition, a predetermined number (for example, 4, 6, 8, or 10) of battery cells or unit modules may be used to constitute a battery module, whereby the required number of battery modules may be effectively mounted within a limited space.

In accordance with another aspect of the present invention, there is provided a middle or large-sized battery pack having high output and large capacity, manufactured using the battery module with the above-stated construction as a unit body.

In a concrete example, the middle or large-sized battery pack may be configured to have a structure in which battery modules are stacked in the lateral direction, and each of the battery modules includes a voltage sensing member.

In addition, the voltage sensing members may be connected to a battery management system (BMS) via wiring harnesses. The BMS may be configured to have a structure for controlling the battery pack using voltage detection values input from the voltage sensing members.

The middle or large-sized battery pack according to the present invention may be manufactured by combining battery modules based on desired output and capacity. Also, the middle or large-sized battery pack according to the present invention is preferably used as a power source for electric vehicles, hybrid electric vehicles, or plug-in hybrid electric vehicles, which have a limited installation space and are exposed to frequent vibration and strong impact in consideration of installation efficiency and structural stability, as previously described.

The general structure of the electric vehicles, the hybrid electric vehicles, and the plug-in hybrid electric vehicles, in which the middle or large-sized battery pack is mounted, is well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing a plate-shaped battery cell, which will be mounted in a battery module;

FIG. 2 is a perspective view showing a battery module according to an embodiment of the present invention;

FIG. 3 is an exploded typical view showing the battery module of FIG. 2;

FIG. 4 is a perspective view showing a battery cell stack in the battery module of FIG. 3; and FIG. 5 is a series of typical views showing a process in which a connection terminal is connected to an electrode terminal connection part.

BEST MODE

Now, exemplary embodiments of the present invention will be described in detail with reference to the accompanying drawings. It should be noted, however, that the scope of the present invention is not limited by the illustrated embodiments.

FIG. 1 is a perspective view typically showing an exemplary plate-shaped battery cell, which will be mounted in a unit module of the present invention.

Referring to FIG. 1, a plate-shaped battery cell 10 is configured to have a structure in which two electrode leads 11 and 12 protrude from the upper end and the lower end of a battery body 13, respectively, in the state in which the electrode leads 11 and 12 are opposite to each other. A sheathing member 14 is a two-unit member. That is, the sheathing member 14 includes an upper member part and a lower member part. In the state in which an electrode assembly (not shown) is mounted in a receiving part formed in the sheathing member 14, lateral sides 14b, upper ends 14a, and lower ends 14c, which are contact regions, of the upper and lower member parts constituting the sheathing member 14 are bonded to each other, whereby the battery cell 10 is manufactured.

The sheathing member 14 is configured to have a laminate structure including a resin layer, a metal foil layer, and a resin layer. Consequently, it is possible to bond the lateral sides 14b and the upper and lower ends 14a and 14c of the upper and lower member parts constituting the sheathing member 14, which are in contact with each other, to each other by applying heat and pressure to the lateral sides 14b and the upper and lower ends 14a and 14c of the upper and lower member parts constituting the sheathing member 14 so as to weld the resin layers thereof to each other. According to circumstances, the lateral sides 14b and the upper and lower ends 14a and 14c of the upper and lower member parts constituting the sheathing member 14 may be bonded to each other using a bonding agent. In the case of the lateral sides 14b of the upper and lower member parts constituting the sheathing member 14, the same resin layers of the upper and lower sheathing parts of the sheathing member 14 are in direct contact with each other, whereby uniform sealing at the lateral sides 14b of the upper and lower member parts constituting the sheathing member 14 is accomplished by welding.

In the case of the upper ends 14a and the lower ends 14c of the upper and lower member parts constituting the sheathing member 140, on the other hand, the electrode leads 11 and 12 protrude from the upper ends 14a and the lower ends 14c of the upper and lower member parts constituting the sheathing member 14, respectively. For this reason, the upper and lower ends 14a and 14c of the upper and lower member parts constituting the sheathing member 14 are thermally welded to each other, in the state in which film type sealing members 16 are interposed between the electrode terminals 11 and 12 and the sheathing member 14, in consideration of the thickness of the electrode leads 11 and 12 and the difference in material between the electrode leads 11 and 12 and the sheathing member 14, so as to improve the sealability of the sheathing member 14.

FIG. 2 is a perspective view typically showing a battery module according to an embodiment of the present invention, FIG. 3 is an exploded typical view showing the battery module of FIG. 2, and FIG. 4 is a perspective view typically showing a battery cell stack shown in FIG. 3.

Referring to these figures, a battery module 100 includes a battery cell stack 110, voltage sensing members 122 and 124, an upper case 130, and a lower case 140.

The battery cell stack 110 is configured to have a structure in which four unit modules 140, which are connected to one another in series, are stacked in the state in which each of the unit modules 140 is stood on one side thereof. The battery cell stack 110 is provided at the front thereof with busbars 116 for connecting electrode terminals of battery cells 114 to external input and output terminals 142 of the lower case 140.

The voltage sensing members 122 and 124 have connection terminals 123 and 125 electrically connected to electrode terminal connection parts 118 and 119 of the unit modules 112, which are located respectively at the front and rear of the battery cell stack 110 to detect the voltages of the unit modules 112.

The voltage sensing members 122 and 124 include a front sensing member 124, which is electrically connected to the electrode terminal connection parts 118 located at the front of the battery cell stack 110, and a rear sensing member 122, which is electrically connected to the electrode terminal connection parts 119 located at the rear of the battery cell stack 110.

The upper case 130 is configured to have a structure for covering the end of one side of the battery cell stack 110 and portions of the upper and lower ends of the battery cell stack 100. The upper case 130 is provided at the front and the rear thereof with mounting parts 132, into which the voltage sensing members 122 and 124 are inserted and mounted.

The lower case 140 is configured to have a structure that is coupled to the upper case 130 while covering the end of the other side of the battery cell stack 110 and portions of the upper and lower ends of the battery cell stack 100. The lower case 140 is provided at the front thereof with external input and output terminals 142.

The battery cell stack 110 includes four unit modules 112, each of which includes two plate-shaped battery cells 114, each of which has electrode terminals formed at the upper and lower ends thereof.

Each of the unit modules 112 includes two battery cells 114, the electrode terminals of which are connected to each other in series and electrode terminal connection parts 118 and 119 of which are bent such that the battery cells 114 are stacked, and a pair of high-strength cell covers 115 coupled to each other so as to cover the entirety of the outer surfaces of the battery cells 114 excluding the electrode terminals of the battery cells 114.

FIG. 5 is a series of typical views showing a process in which a connection terminal is connected to an electrode terminal connection part.

Referring to FIG. 5 together with FIG. 2, the voltage sensing member 124, which is inserted in the mounting part 132 of the upper case 130, includes a hollow body 128 and a connection terminal 125 connected to the electrode terminal connection part 118 in the state of being inserted in the hollow body 128.

The connection terminal 125 is provided at the lower end thereof with connection pieces 126, which are elastically connected to the opposite sides of the electrode terminal connection part 118. In the state in which the connection terminal 125 is not connected to the electrode terminal connection part 118, the width $W_1$ between the connection pieces 126 is greater than the width $W_2$ of the electrode terminal connection part 118. In addition, the distance between the connection pieces 126 is decreased such that the connection pieces 126 come into tight contact with the opposite sides of the electrode terminal connection part 118 as the voltage sensing member 124 is moved toward the electrode terminal connection part 118.

That is, since the mounting part 132 is configured to have a structure in which the width of the mounting part 132 is gradually decreased in the direction in which the electrode terminal connection part 118 is inserted, the distance between the hollow body 128, which is disposed in tight contact with the inside of the mounting part 132, and the connection pieces 126 is also decreased as the voltage sensing member 124 is moved toward the electrode terminal connection part 118, whereby the connection pieces 126 are connected to the opposite sides of the electrode terminal connection part 118 while the connection pieces 126 are in tight contact with the opposite sides of the electrode terminal connection part 118.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a voltage sensing member configured to have a receptacle structure, which is included in a battery module according to the present invention, is connected to an electrode terminal connection part using a simple assembly method without using a plurality of members for mechanical fastening and electrical connection, whereby it is possible to reduce the overall cost of manufacturing the battery module and to stably detect the voltage of the battery module even when strong external impact or vibration is applied to the battery module.

In addition, it is possible to prevent damage to the electrode terminal connection part, which may occur when the electrode terminal connection part is inserted into the voltage sensing member, which is included in the battery module according to the present invention, so as to detect the voltage of the battery module, whereby it is possible to reduce the defect rate in the battery module manufacturing process and to improve the safety of the battery module.

The invention claimed is:

1. A battery module comprising:
   a battery cell stack configured to have a structure in which a plurality of battery cells or unit modules connected to each other in series and/or in parallel is stacked in a state in which each of the battery cells or the unit modules is stood on one side thereof;
   voltage sensing members provided with connecting terminals electrically connected to electrode terminal connection parts of the battery cells located at a front and a rear of the battery cell stack for detecting voltages of the battery cells or the unit modules;
   an upper case configured to have a structure for covering an end of one side of the battery cell stack and portions of upper and lower ends of the battery cell stack, the upper case being provided with mounting parts, into which the voltage sensing members are inserted and mounted; and
   a lower case configured to have a structure that is coupled to the upper case while covering an end of the other side of the battery cell stack and portions of the upper and lower ends of the battery cell stack, the lower case being provided at a front thereof with external input and output terminals,
   wherein each of the voltage sensing members is configured to have a receptacle structure in which each of the voltage sensing members is fitted onto a corresponding one of the electrode terminal connection parts from an upper part of each of the voltage sensing members, and each of the mounting parts is configured to have a structure in which the width of the mounting part is decreased in a direction in which a corresponding one of the electrode terminal connection parts is inserted,
   wherein each connecting terminal of each voltage sensing member comprises opposing connection pieces elastically connected to opposite sides of a corresponding one of the electrode terminal connection parts and engaging the respective mounting part of the upper case, and
   wherein the opposing connection pieces are configured to have a structure in which a distance between the opposing connection pieces is decreased, as the corresponding one of the electrode terminal connection parts is inserted into the opposing connection pieces, such that the opposing connection pieces come into tight contact with the opposite sides of the corresponding one of the electrode terminal connection parts.

2. The battery module according to claim 1, wherein each of the battery cells is a plate-shaped battery cell having electrode terminals formed at an upper end and a lower end thereof.

3. The battery module according to claim 1, wherein the voltage sensing members comprise a front sensing member connected to one of the electrode terminal connection parts located at a front of the battery cell stack and a rear sensing member connected to the other of the electrode terminal connection parts located at a rear of the battery cell stack.

4. The battery module according to claim 3, wherein the front sensing member and the rear sensing member each comprise a connector-type hollow body and a connection terminal connected to a series-connected bent portion of electrode terminals of the battery cells (a corresponding one of the electrode terminal connection parts) in a state of being inserted in the body.

5. The battery module according to claim 4, wherein the body is configured to have a structure in which a lower part of the body is divided into a plurality of parts such that each of the electrode terminal connection parts is inserted into a corresponding one of the connection terminals.

6. The battery module according to claim 5, wherein the body of the front sensing member is configured to have a structure in which the lower part of the body is divided into three parts, and the body of the rear sensing member is configured to have a structure in which the lower part of the body is divided into four parts.

7. The battery module according to claim 1, wherein a distance between the opposing connection pieces, connected to the opposite sides of the corresponding one of the electrode terminal connection parts, is greater than a width of a corresponding one of the electrode terminal connection parts.

8. The battery module according to claim 7, wherein the distance between the opposing connection pieces is 105% to 200% of the width of the corresponding one of the electrode terminal connection parts.

9. The battery module according to claim 1, wherein the mounting parts are formed in the front and the rear of the upper case such that the mounting parts are open upward.

10. The battery module according to claim 1, wherein the voltage sensing members, which are open upward, are covered by insulative covers such that the voltage sensing members are sealed from an outside.

11. The battery module according to claim 1, wherein the battery cell stack comprises a plurality of unit modules, each of which comprises a plurality of plate-shaped battery cells, each of which has electrode terminals formed at upper and lower ends thereof, and each of the unit modules comprises:

two or more battery cells, the electrode terminals of which are connected to each other in series and/or in parallel; and a pair of high-strength cell covers coupled to each other so as to cover an entirety of an outer surface of the battery cell stack excluding the electrode terminals of the battery cells.

12. A middle or large-sized battery pack having high output and large capacity, manufactured using a battery module according to claim 1 as a unit body.

13. The battery pack according to claim 12, wherein the battery pack is configured to have a structure in which battery modules are stacked in a lateral direction.

14. The battery pack according to claim 13, wherein the voltage sensing members are connected to a battery management system (BMS) via wiring harnesses.

15. The battery pack according to claim 12, wherein the battery pack is used as a power source of an electric vehicle, a hybrid electric vehicle, or a plug-in hybrid electric vehicle.

16. The battery module according to claim 1, wherein each voltage sensing member includes a hollow body surrounding a connection terminal, wherein each hollow body engages the respective mounting part of the upper case, and wherein each connection terminal includes the opposing connection pieces.

17. A battery module comprising:

a battery cell stack including a plurality of battery cells;

voltage sensing members provided with connecting terminals electrically connected to electrode terminal connection parts of the battery cells located at a front and a rear of the battery cell stack for detecting voltages of the battery cells;

an upper case covering an end of one side of the battery cell stack, the upper case being provided with mounting parts, into which the voltage sensing members are inserted and mounted; and a lower case coupled to the upper case while covering an end of an other side of the battery cell stack, wherein each of the voltage sensing members is fitted onto a corresponding one of the electrode terminal connection parts from an upper part of each of the voltage sensing members, and each of the mounting parts is configured to have a structure in which the width of the mounting part is decreased in a direction in which a corresponding one of the electrode terminal connection parts is inserted, wherein each connecting terminal of each voltage sensing member comprises opposing connection pieces elastically connected to opposite sides of a corresponding one of the electrode terminal connection parts and engaging the respective mounting part of the upper case, and wherein the opposing connection pieces are configured to have a structure in which a distance between the opposing connection pieces is decreased, as the corresponding one of the electrode terminal connection parts is inserted into the opposing connection pieces, such that the opposing connection pieces come into tight contact with the opposite sides of the corresponding one of the electrode terminal connection parts.

18. The battery module according to claim 17, wherein each voltage sensing member includes a hollow body surrounding a connection terminal, wherein each hollow body engages the respective mounting part of the upper case, and wherein each connection terminal includes the opposing connection pieces.

* * * * *